Jan. 21, 1947.   A. VANG   2,414,495

METHOD AND MEANS FOR PRECIPITATING FOG

Filed Jan. 15, 1943

INVENTOR.
ALFRED VANG.

BY

ATTORNEY.

Patented Jan. 21, 1947

2,414,495

UNITED STATES PATENT OFFICE 2,414,495

METHOD AND MEANS FOR PRECIPITATING FOG

Alfred Vang, Summit, N. J.

Application January 15, 1943, Serial No. 472,495

6 Claims. (Cl. 98—1)

This invention relates to new and useful improvements in a method and means for precipitating or dissipating fog.

It is the general object of the invention to provide a simple and effective method and apparatus for condensing, to a greater or less extent, and thereby precipitating over limited regions the relatively stationary and more or less heavy ground or sea fog which destroys visibility, for example, over airfields, over limited war areas for revealing hidden positions, over manoeuvre areas, over the portion of a roadway immediately in advance of a traveling automobile, over sea lanes, etc.

More specifically, it is an object of this invention to convert heavy or wet fog to light or dry fog within limited areas, which are, however, of sufficient size to make the process useful for airplane fields and the decks of carriers, for automobile travel, etc.

As is known, rain is caused by the cooling of moisture-laden air until the dew point is reached or passed. Then condensation begins to settle on the innumerable dust particles or other condensation nuclei present in the atmosphere. This process forms clouds which slowly fall and as a result of various phenomena, like air currents, relative movements among the moisture particles occur, with the result that they are forced together, forming droplets which continue to grow as the process continues. Presently the larger droplets coalesce and become heavy enough to fall. Their falling causes them to collide with and pick up additional droplets, and we have rain.

It will be noted that the rain or precipitation of moisture from the atmosphere is caused when a certain condition arises within the cloud, and this also holds true for fog, which is nothing more than clouds. The condition is one which caused the innumerable droplets to collide and coalesce to form the heavier drops. Basically, this invention teaches a method and means for causing the innumerable droplets formed about condensation nuclei to collide and coalesce to form falling drops. In rain the upward rising of the air through the clouds causes this condition. The present invention proposes the use of vibrations, including those in the supersonic range, to cause the collision and coalescence of the innumerable droplets into falling drops.

The present invention accordingly produces a method for dissipating fog which essentially consists in vibrating the atmosphere to cause the droplets of fog to collide and coalesce into larger aggregates which then fall to the ground. An important feature of the invention is the nature of these vibrations. The vibrations used in accordance with my method are of controlled amplitudes and frequencies preferably of erratic character, causing commotion or mixing of the moisture-enveloped condensation nuclei. This kind of controlled vibration differs radically in its effects from the more or less constant wave vibrations usually traveling through the atmosphere.

The apparatus according to the invention for precipitating or dissipating fog is characterized by a diaphragm adapted to vibrate the atmosphere, and means for vibrating the diaphragm associated with controlling means for said vibrations to vary the wave lengths and frequency to cause the condensation nuclei of fog to collide and coalesce into larger drops which fall to the ground.

Further the invention proposes to so support the diaphragm that the vibrations may be directed in various directions.

The invention contemplates the use of an electronic oscillation tube and circuit for controlling the vibrations of the diaphragm. It is proposed to control the electronic oscillation tube by variable means for feeding more energy from the plate circuit to the grid circuit than is required to equal the power loss in the grid circuit to cause the tube to oscillate. It is proposed to characterize this variable means by a condenser for abruptly changing the capacity of the system and so control the frequency and wave lengths, as required.

An important feature of the invention resides in the fact that a relatively small amount of power is necessary to precipitate fog. It should be noted that no attempt is made to raise or lower the temperature of large quantities of air for the dispersal of fog. Instead, a small force is utilized to vibrate the minute condensation nuclei with their envelopes of moisture to cause them to coalesce and fall.

My improved method and means for dissipating fog can be applied also to chemical artificial fog generally used in warfare as screens. Such artificial fog is also composed of small vapor-enveloped condensation nuclei which may be vibrated to collide and coalesce into a liquid, and then fall.

With the above and other objects in view, this invention consists of the novel features of construction, combination, and arrangement of parts, hereinafter fully described, claimed, and illustrated in the accompanying drawing, forming part of this application, and in which similar characters of reference indicate corresponding parts in all views, and in which:

Figure 1:
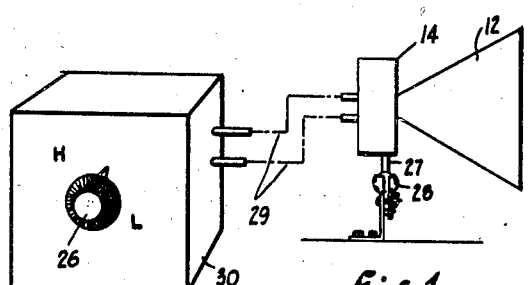
Figure 1 is a schematic view of means for dispersing fog constructed in accordance with this invention.
Figure 2:
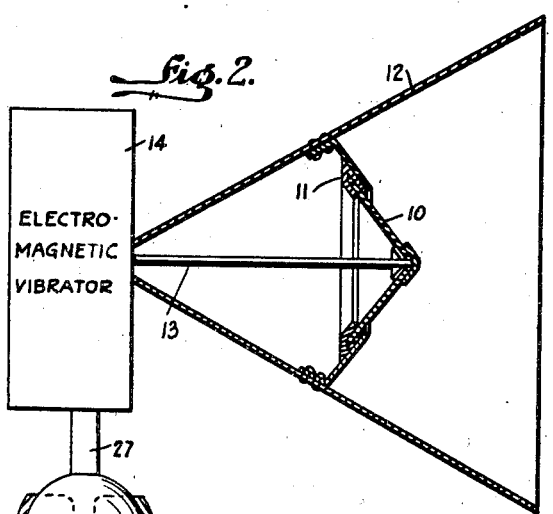
Figure 2 is a fragmentary enlarged partly sectional view of the right hand portion of the apparatus shown in Figure 1.
Figure 4:
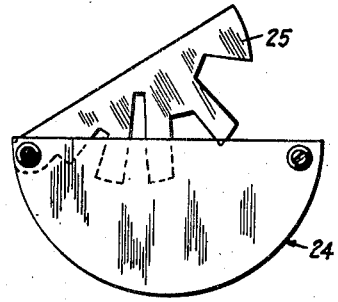
Figure 4 is a side elevational view of the variable condenser, schematically shown in Figure 3.
Figure 3:
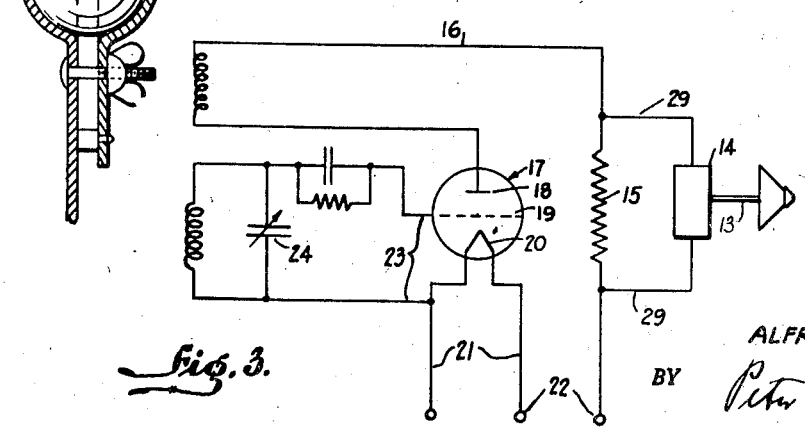
Figure 3 is a schematic wiring diagram of the means for dispersing fog in accordance with this invention.

The means for dispersing fog, in accordance with this invention, makes use of a diaphragm 10 adapted to vibrate the atmosphere with sonic waves. The diaphragm is shown of conical shape, because this is the preferred form, though other shapes may well be used. The diaphragm 10 is supported at its edge by an annular member 11, which in turn is supported within a horn 12 or other cone shaped directing member. The apex of the diaphragm 10 connects with a vibrating needle 13 which is connected with the usual electro-magnetic vibrator 14, such as is used in loud speakers. This electro-magnetic vibrator 14 is shunted across a load resistance 15 of the plate circuit 16 of an electronic oscillation tube 17. This electronic oscillation tube is a standard radio tube having the usual plate 18, grid 19, and filament 20.

The filament 20 of the tube 17 is connected in a circuit 21 for the "A" battery. The plate circuit 16 includes the terminals 22 for the "B" battery. A feed-back circuit 23 is connected with the grid 19 to feed back more energy than is lost in the grid circuit to cause the tube to oscillate. While one particular feed-back circuit 23 is schematically illustrated, it is pointed out that any number of circuits may be utilized, but it will be found that all will depend on feeding back more energy from the plate circuit to the grid circuit than is required to equal the power loss in the grid circuit. Under these conditions the tube will oscillate. The action is one of regular surges of power between the plate and grid circuits at a frequency dependent on the circuit constants of inductance and capacity. A variable condenser 24 is provided to change these constants. By proper choice of these values the frequency may be adjusted over a very wide range. Other types of tubes may be used for obtaining vibrations in ranges of lower frequencies and high power, for example, a tube of the nature shown in A. Vang, U. S. Patent No. 2,287,541.

The condenser 24 preferably should be designed to give erratic capacity variations. This may be accomplished by designing the movable set of plates 25 of erratic shapes, as for example illustrated in Figure 4. The variable condenser 24 may be provided with the conventional tuning knob 26, by which it may be continuously adjusted over an extended period of time such as is sufficient to create locally a region of relative transparency in a foggy atmosphere.

The electro-magnetic vibrator 14 is supported by a stem 27, which in turn is supported by a universal joint 28. With this construction, the horn 12 may be aimed in selected directions. The electro-magnetic vibrator 14 may be connected by the leads 29 with the plate circuit 16. The tube 17 and its associate circuits may be contained in a cabinet 30

For automobile and airplane use the cabinet 30 may be mounted on the control panel board, and the electro-magnetic vibrator 14 on some exterior part of the vehicle. For airplane landing fields and other stationary purposes the apparatus may be located in a control house, as desired.

The operation of the device is as follows:

In order to disperse fog, the horn 12 is aimed in the direction of the area in which dispersing is desired. The circuit containing the electron tube 17 is then set into operation to indirectly cause the vibration of the diaphragm 10. This diaphragm will vibrate the atmosphere. The condenser 24 is quickly manipulated back and forth so as to cause the plates 25 to engage and disengage between the stationary plates of the condenser. This action changes the capacity and inductance of the system which will control the frequency of the vibrations of the diaphragm 10. These vibrations must be of a nature so as to cause the fog particles to collide and coalesce into larger aggregates which then fall to the ground.

For use on an automobile it is merely necessary that the device be capable of dispersing fog several hundred yards to the front of the vehicle. A larger unit will of course be needed for dispersing fog over a flying field.

Having thus described my invention, what I claim as new and desire to secure by United States Letters Patent is:

1. A method of precipitating relatively stationary ground or sea fog, comprising subjecting a foggy atmosphere to controlled sonic vibrations of changing and random frequencies substantially continuously over a period of time sufficient to cause the suspended fog particles to collide and coalesce into larger aggregates which fall to the ground.

2. A method according to claim 1, wherein the frequencies are within the audible range.

3. A method of precipitating relatively stationary ground or sea fog, comprising subjecting a foggy atmosphere to controlled sonic vibrations of changing and random frequencies and amplitudes substantially continuously over a period of time sufficient to cause the suspended fog particles to collide and coalesce into larger aggregates which fall to the ground.

4. Means for precipitating relatively stationary ground or sea fog, comprising a diaphragm adapted to vibrate the atmosphere, means for vibrating said diaphragm, and means for erratically controlling said vibrations to produce a succession of random frequencies to cause the fog particles to collide and coalesce into larger aggregates which fall to the ground.

5. Means for precipitating relatively stationary ground or sea fog, comprising a diaphragm adapted to vibrate the atmosphere, means for vibrating said diaphragm, and means for erratically controlling said vibrations to produce a succession of random frequencies, and including an oscillating circuit having an erratically variable condenser, to cause the fog particles to collide and coalesce into larger aggregates which fall to the ground.

6. Means for precipitating relatively stationary ground or sea fog, comprising a diaphragm adapted to vibrate the atmosphere, electromagnetic means for vibrating said diaphragm, and means for controlling said vibrations to produce a succession of random frequencies to cause the fog particles to collide and coalesce into larger aggregates which fall to the ground, the means for vibrating said diaphragm including an electronic oscillating tube and circuit and an erratically variable condenser in said circuit.

ALFRED VANG.